Aug. 30, 1949.   J. N. LAYCOCK   2,480,144
PONTOON ASSEMBLY
Filed Aug. 12, 1943   11 Sheets-Sheet 1

J. N. LAYCOCK,
INVENTOR,
BY *S. E. Bush*
ATTORNEY.

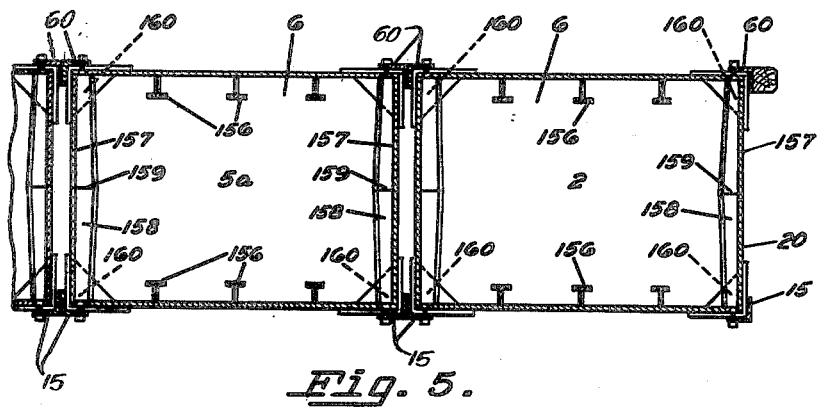
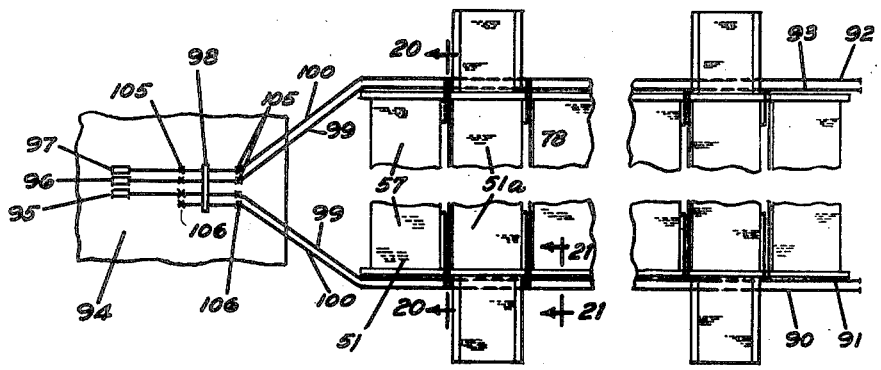
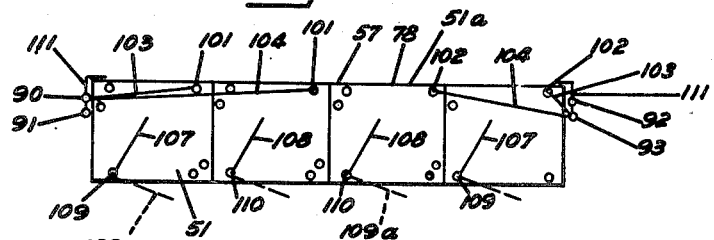
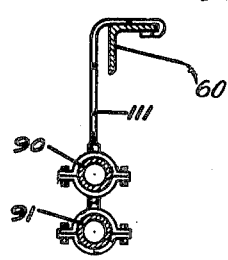

Aug. 30, 1949.    J. N. LAYCOCK    2,480,144
PONTOON ASSEMBLY
Filed Aug. 12, 1943    11 Sheets-Sheet 3
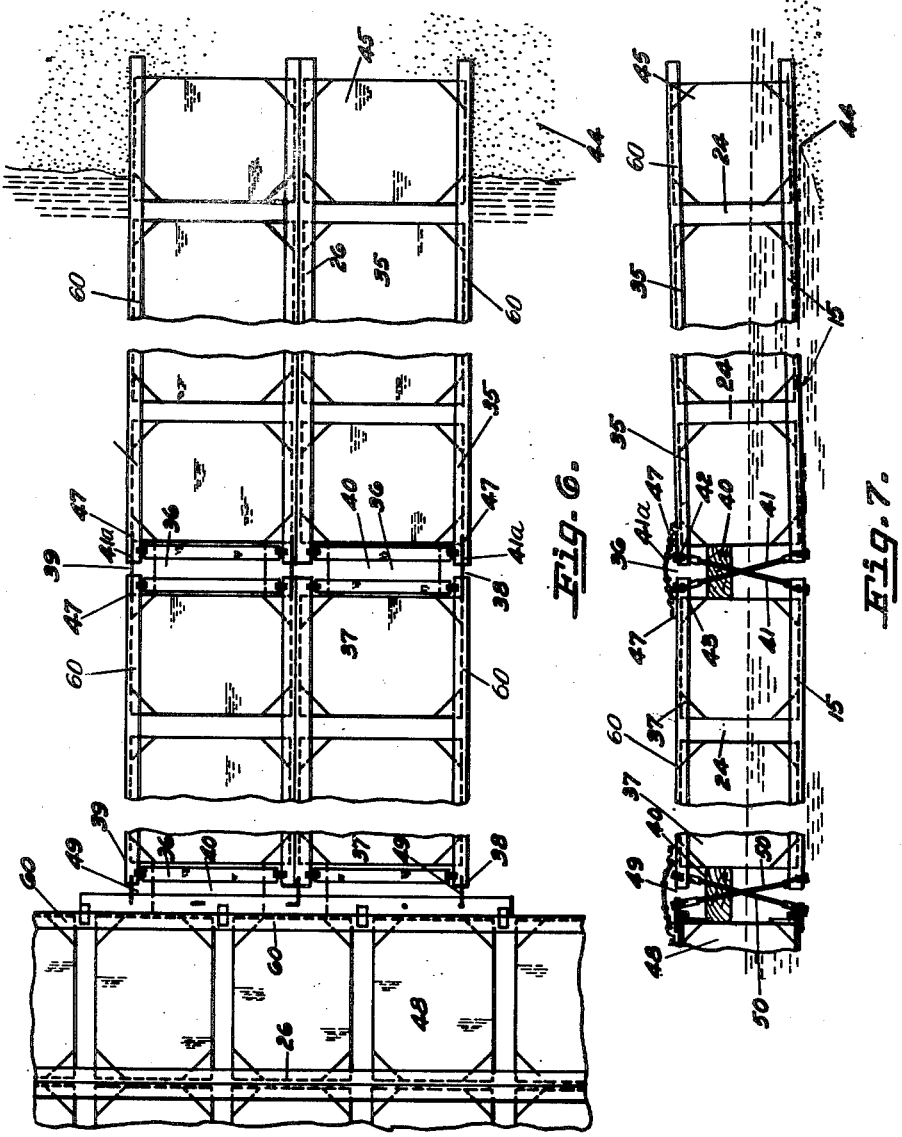
J. N. LAYCOCK
INVENTOR
BY
ATTORNEY

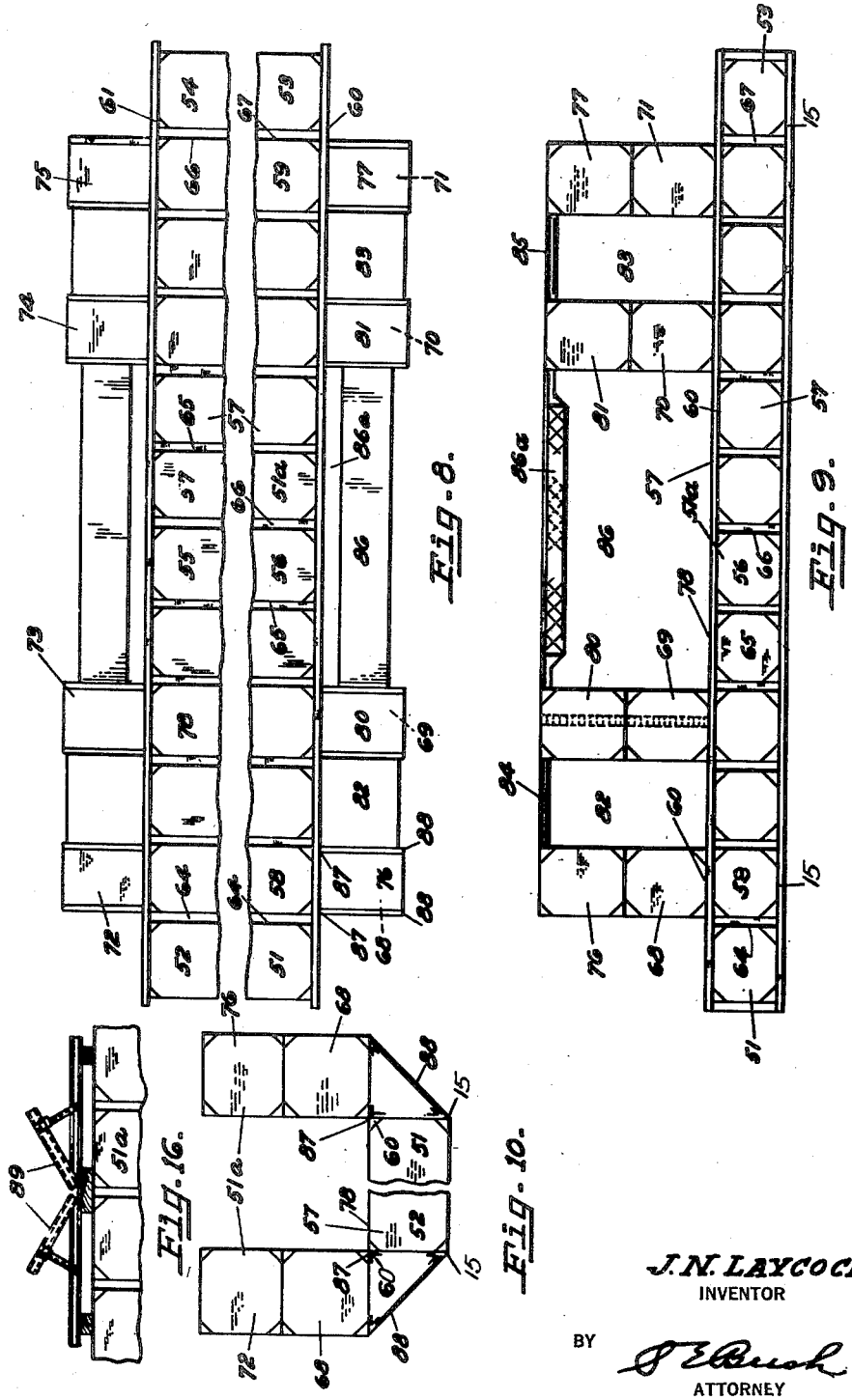

Aug. 30, 1949. J. N. LAYCOCK 2,480,144
PONTOON ASSEMBLY
Filed Aug. 12, 1943 11 Sheets-Sheet 5

J. N. LAYCOCK.
INVENTOR
BY
ATTORNEY

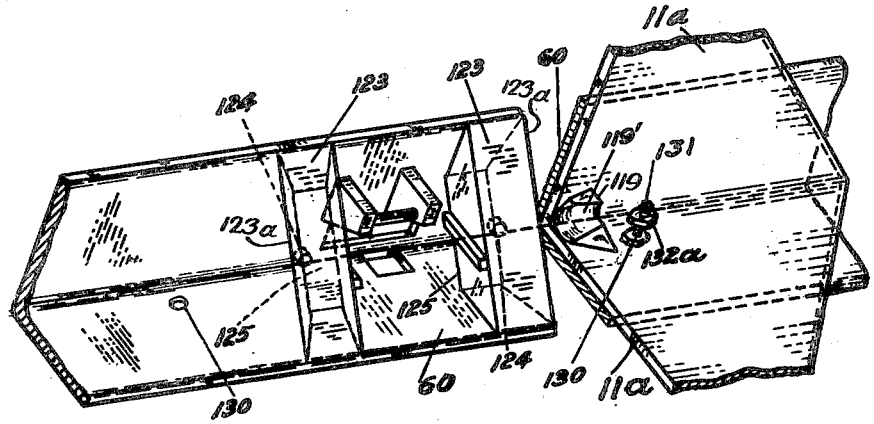
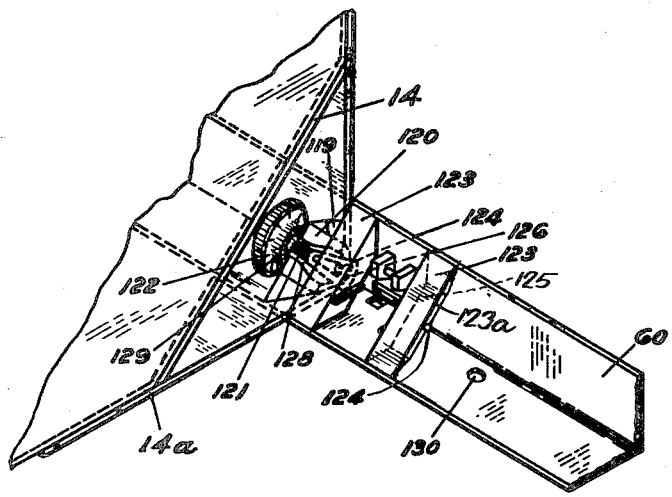
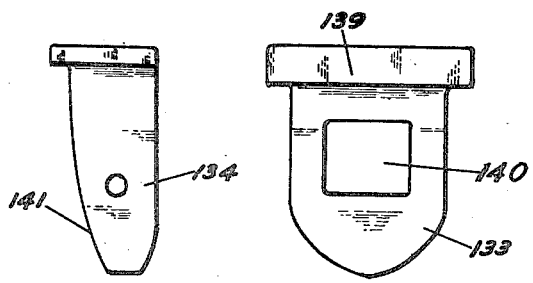

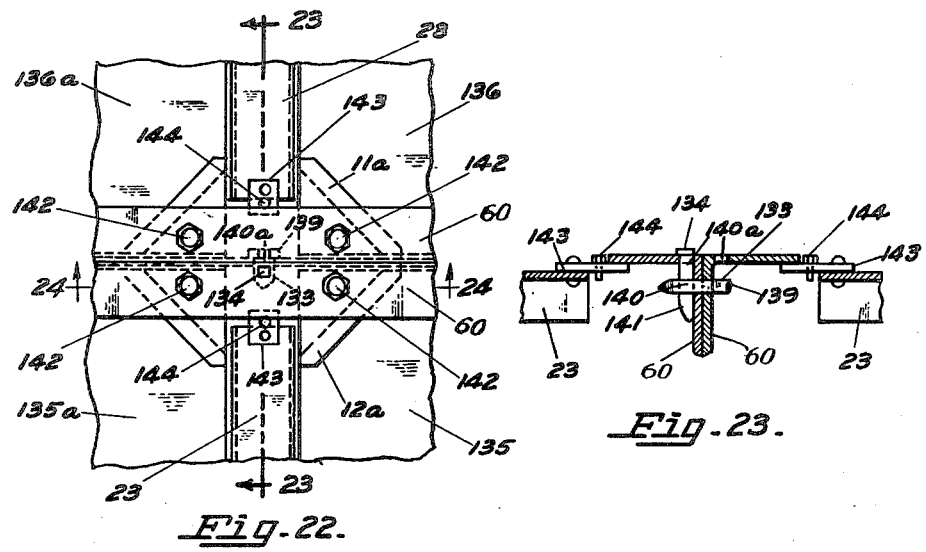
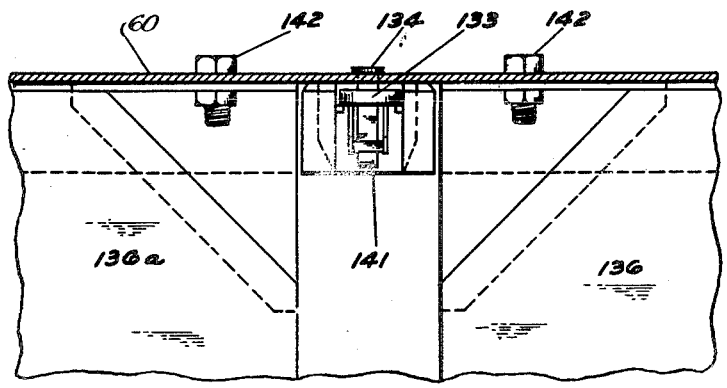

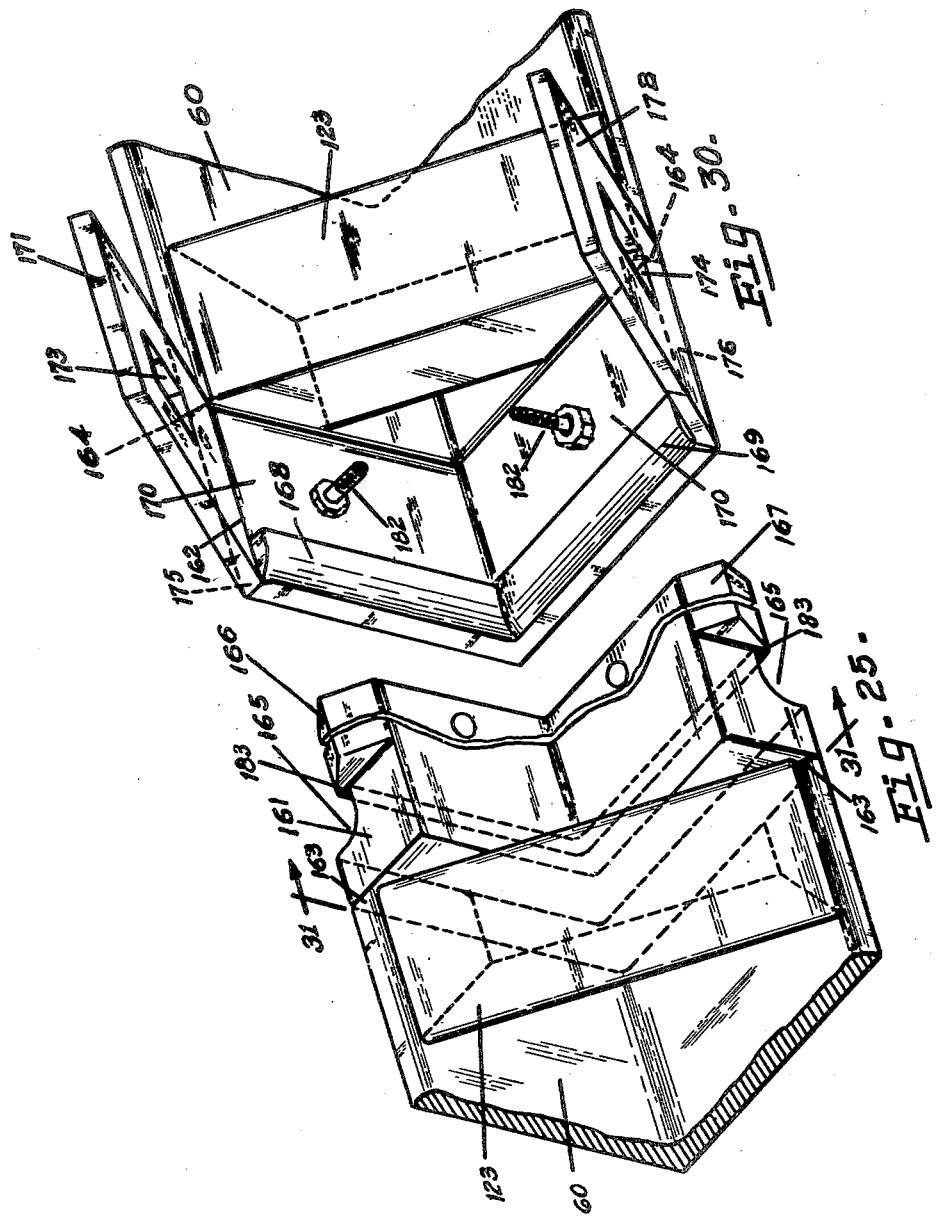

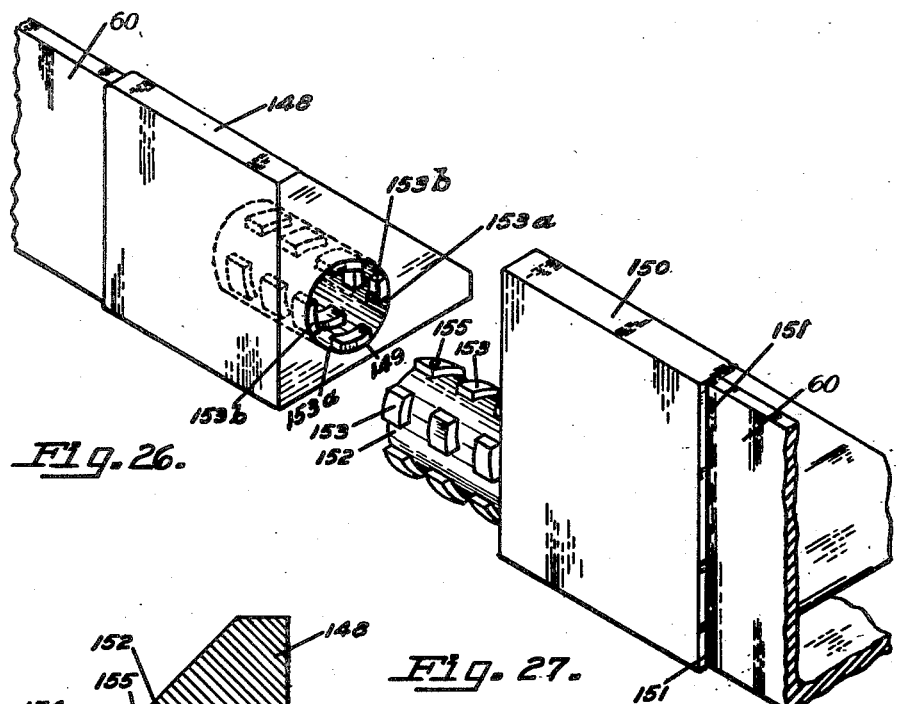
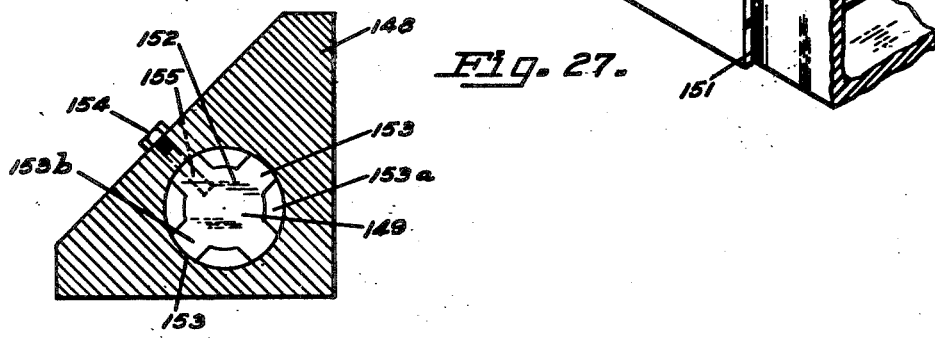
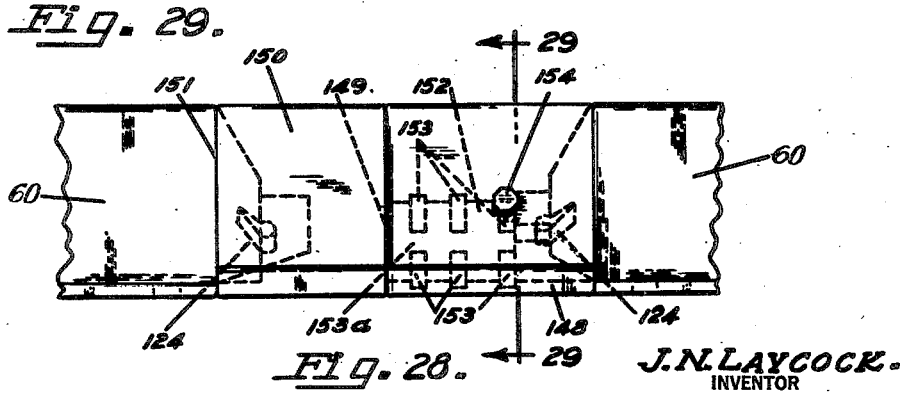

Aug. 30, 1949.   J. N. LAYCOCK   2,480,144
PONTOON ASSEMBLY

Filed Aug. 12, 1943   11 Sheets-Sheet 10

*INVENTOR.*
J. N. LAYCOCK
BY
ATTORNEY

Aug. 30, 1949.  J. N. LAYCOCK  2,480,144
PONTOON ASSEMBLY

Filed Aug. 12, 1943  11 Sheets-Sheet 11

J. N. LAYCOCK
INVENTOR

BY
ATTORNEY

Patented Aug. 30, 1949

2,480,144

UNITED STATES PATENT OFFICE 2,480,144

PONTOON ASSEMBLY

John N. Laycock, United States Navy

Application August 12, 1943, Serial No. 498,284

33 Claims. (Cl. 114—0.5)

(Granted under the act of March 3, 1883, as amended April 30, 1928; 370 O. G. 757)

The present invention relates to what is called a "pontoon assembly" and consists in the use of a plurality of preferably airtight pontoon units which may be assembled in a variety of groupings, both longitudinally and transversely, and rigidly attached to each other and used for a large number of different applications, such as those named below.

Some of the applications to which the invention may be put are, pontoons in a longitudinal string, barge assembly, bridge unit assembly, wharves, pontoon floating drydock, revolving floating cranes, and similar uses.

The invention is particularly useful in establishing landing and dock facilities for advance bases where no facilities exist for both military, naval and commercial purposes. It is a set of interchangeable parts, which can be assembled in a great many ways, just a few of which are described in the present specification.

The airtight units are preferably hollow, and made of metal to resist internal and external pressure, as well as deck loads. These units are connected to each other longitudinally by continuous elongated structural members which enable them to be used as a beam or girder, both longitudinally and transversely when a number of the units are fastened together.

The strings of pontoons are quite stiff also in torsion, and structures assembled from them are highly rigid and of great strength when used for any of the purposes set out above, such as bridge or barge units, wharves, drydocks and the like.

One of the principal purposes of the present invention is the use of the buoyancy of the airtight units for flotation purposes in combination with their ability to be used as a structural unit when a number of the airtight units are fastened together.

When the present invention is used as a bridge or viaduct, it is immaterial whether the pontoons are made airtight or not, but when they are used to form a structure which is like a barge or a floating dry-dock and for similar purposes it is seen that the airtight feature of the individual pontoons becomes important. When the pontoons are used to form a drydock, provision is made whereby the air may be forced out of the individual pontoons and water permitted to enter them in order to sink the structure beneath the surface of the water; and when it is desired to again raise the drydock above water level, air is forced into the individual pontoons and the water expelled therefrom, as is at once understood, whereupon the group of pontoons forming the drydock immediately rises above the surface of the water to any desired degree, according to the air pressure used and the amount of water expelled from the units.

The various means used to secure the pontoon units in side-by-side and end-to-end relation are new and ingenious and form part of the specific details of the present invention, as will be described herein.

When a group of pontoon units is used to construct a barge, propelling means may be used so that the barge can operate in a manner similar to a boat or other water craft. Several different types of propulsion are at present used in connection with barges and will be explained more thoroughly below.

The group of pontoon units may be assembled on land and launched into the water, either as a number of pontoon strings, and then attached to each other, or as a fully formed barge having rigid longitudinal and transverse connections.

When the device is used as a wharf, barge, or drydock, etc. assembly, provision is sometimes made whereby one group of pontoon units may be elevated to or raised on the inclined shore adjacent thereto, while another group of pontoon units secured to the first-named group remain fully floating in the water. Also, when the device is arranged as a bridge, wharf or barge, etc., provision is made to enable the deck surface of one group of units to be kept in alignment horizontally with a second group of units. This particular means will be further described in the specification.

When the device is used as a floating drydock certain airtight units are built up considerably higher than the portion of the drydock which carries the load, such as a boat or ship which is mounted on the deck of the drydock. The purpose of these elevated groups of units is to enable the lower or deck portion of the device to be submerged to any desired depth, and yet the structure as a whole maintains a certain amount of stability, due to the built-up units which are placed along the outside boundary of the deck structure. These features will also be more fully described in the specification.

The individual pontoon units of the present invention are specially constructed and have features which enable them to be quickly and securely fastened together in side-by-side, or end-to-end relation with each other, and may also be readily de-mounted and reduced to the individual units as quickly as they were formed into groups. This feature, it is evident, is quite important where it is desired to establish landing and docking facilities for military or similar purposes.

With the foregoing in view, the invention involves a sectional structure comprising a plurality of box-like elements or units arranged adjacent to each other in a row, with elongated members extending longitudinally of said row and continuously along aligned surfaces of said plurality of box-like elements, and securing means extending between each of said plurality of box-like elements and said continuous elongated members and rigidly securing each box-like element of the row individually to the continuous elongated members, so as to provide a rigid structure capable of functioning as a girder with the said continuous elongated members comprising girder flange or chord means capable of transmitting and sustaining tensile and compressive forces of bending and substantially relieving the box-like elements of such main flange stresses, and the box-like elements comprising girder web means transmitting and sustaining shearing stress in said rigid girder structure.

The invention further involves such an assembly in which the box-like elements are provided with recesses one at each end of each longitudinal corner of the box-like element, with the securing means extending between said elongated members and the box-like elements and into the said recesses at each end of the corresponding corners of the box-like elements, the securing means being accessible for individual adjustment by means of said recesses.

The invention also involves the provision of at least one pair of continuous elongated angle members, receiving in each one of said pair of angle members one of a pair of longitudinal corners of each box-like element, with the securing means including wedge means mounted in each of the recesses at the ends of the longitudinal corners of the box-like elements and extending from said recesses into wedging engagement with the corresponding angle member in rigid securement.

The invention further involves an assembly as above described, in which each box-like element transmits to the rigid elongated members an increment only of the load in shear, thus subjecting the securing means to no more stress than the said increment transmitted by such element, while the rigid elongated members which extend continuously along the row of said box-like elements, are disposed to carry the major tensile and compressive forces as do the chords of a truss.

The invention also involves the provision of the row of box-like elements united together by the continuous elongated members having their cross-sectional center of gravity on a line passing through said elements, and forming a structural assembly in the form of a girder and which may be readily assembled and disassembled.

Other features and advantages involved in the invention will appear from the following detailed description having reference to the exemplary embodiment set forth in the accompanying drawings.

In the accompanying drawings, forming part of the present specification:

Fig. 5 is a vertical transverse section on line 5—5 of Fig. 1.

Fig. 6 is a plan view of a wharf built up of a plurality of the box-like units.

Fig. 7 is a longitudinal elevation of a portion of Fig. 6, showing a convenient structural feature used between groups of the units shown in Fig. 6.

Fig. 8 is a plan view of a floating drydock built up of the airtight box-like units, showing towers on each side of the central portion of the structure, used for maintaining buoyancy and equilibrium of the dock when the lower portion of the dock is partly or fully submerged.

Fig. 9 is a side elevation of Fig. 8, showing towers and catwalk used.

Fig. 10 is an end elevation of Fig. 8.

Fig. 14 is a perspective view of a longitudinal assembly angle used to fasten adjoining pairs of pontoon units together, with the angle broken across and the parts somewhat separated to show details of some of the associated parts thereof.

Fig. 15 is a perspective view of a longitudinal assembly angle, a wedge, wedge bars and wedge bolt, in operative positions for securing a corner of a box-like element to a longitudinal stringer angle.

Fig. 16 is a vertical elevation showing part of the central portion of Fig. 10 with a cradle mounted thereon to receive a boat or ship.

Fig. 17 is an enlarged side view of a locking pin used with the invention.

Fig. 18 is a front view of a link used with the pin shown in Fig. 17.

Fig. 19 is a longitudinal plan view of a portion of pontoon drydock, showing the arrangement of air hose and pipe lines leading from an air compressor manifold, the latter being mounted on a supporting pontoon barge.

Fig. 20 is a transverse elevation on line 20—20 of Fig. 19, showing in outline the pontoon drydock shown in Fig. 19, showing diagrammatically the air line connections to the pontoons and the revolvable pipes through which the pontoons can be filled and emptied of water.

Fig. 21 is an enlarged detail cross-section on line 21—21 of Fig. 19, showing the means used to support the pipe lines from the longitudinal stringer angles shown at a smaller scale in Fig. 20.

Fig. 22 is a partial plan view of the ends of two portions of a pontoon structure, showing the arrangement of the closure deck channels, and associated parts, and the means used for fastening the ends of the pontoons together.

Fig. 23 is a partial enlarged transverse vertical section on line 23—23 of Fig. 22.

Fig. 24 is an enlarged partial longitudinal vertical section on line 24—24 of Fig. 22.

Fig. 25 is a perspective view of one part of a wedge angle-splice used with the invention.

Fig. 26 is a perspective view of a female device used for connecting the ends of two adjacent longitudinal stringer angles forming a pontoon structure together.

Fig. 27 is a perspective view of a male device which is complementary to the device shown in Fig. 26.

Fig. 28 is a rear view in elevation of the breech plug splice shown in Figs. 26 and 27.

Fig. 29 is a transverse section taken on line 29—29 of Fig. 28.

Fig. 30 is a perspective view of a second part of the wedge angle-splice shown in Fig. 25.

Figure 1:
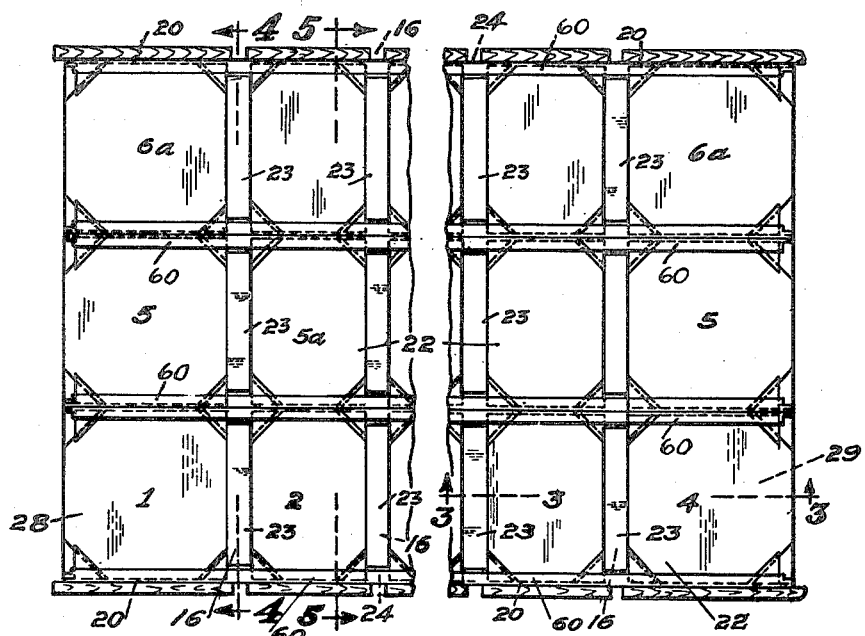
Fig. 1 is a plan view of a barge built up of a plurality of airtight box-like units.

The present invention is one which is composed of a number of pontoon units, which in some instances are made airtight, for the purpose of making said units buoyant. In the present invention the combination of a number of units (which are more fully described as the specification proceeds herein), makes it possible to take advantage in a number of ways, of the additional features which result from a structural combination of said units. For instance, when a number of units are securely fastened together to form a group, the longitudinal bending and compression strength of said units is increased, and the longitudinal and transverse strength of the whole structure is very great. Also the torsional strength of a group of units when properly secured together, is greatly augmented over the strength of an equal number of loosely associated units.

Again, the present invention when used as a barge, a wharf, a drydock, and the like, takes advantage of the buoyancy of the units as well as their combined structural strength in tension, compression and/or torsion, as will presently appear.

The particular uses or applications to which the present invention idea has so far been put, are as follows:

An assembly of pontoon strings,
Barge assemblies,
Bridge unit assemblies,
Wharf assemblies,
Pontoon floating drydocks,
Floating cranes, and
Landing ramps.

Many other uses in which the elementary idea of combining these pontoon units, and using their buoyancy features, by making the units airtight, will be found in practice.

*Pontoon strings and barges*

The method of using the hollow pontoon units in combination, for a string of pontoons and/or barges will first be described herein, and thereafter other uses such as those named above will be described.

In Figs. 1 to 5 inclusive, is shown a number of pontoons, 1, 2, 3, 4, 5, 6a, etc., which are rigidly secured together to form a barge. The part 60 represents a longitudinal top edge stringer or continuous elongated member, preferably formed of a structural angle "shape" which runs along the longitudinal top edge or longitudinal corner of a number of pontoons 1, 2, 3, 4. Said angle 60 is preferably a single continuous angle which has a means for fastening the individual pontoons rigidly thereto by special means described below. The interior of the pontoons will also be described in detail herein.

A lower continuous longitudinal angle stringer 15, similar to 60, is used along the bottom edges or longitudinal corners of the pontoon units 1, 2, 3, 4, etc., and on both longitudinal sides of a group of units in order to hold them in rigid relation longitudinally.

Figure 11:
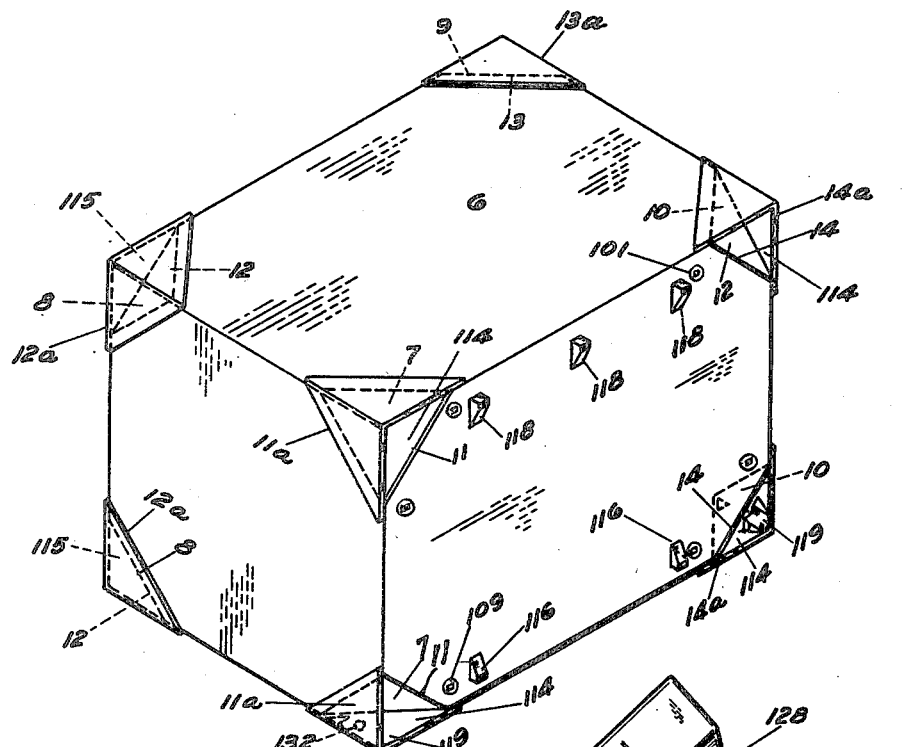
Fig. 11 is a perspective view of one of the box-like units which is the elementary basis of the present invention.

The pontoons per se are composed primarily of a hollow (preferably metal) closed box or unit, as shown at 6 in Fig. 11 clearly. The said box or unit when used for purposes such as a barge, or drydock is normally made airtight, so it is buoyant, but in many cases when used for viaducts or bridges on land, these boxes or units are not made airtight. The full description of the details of these boxes will be given herein. However, attention is called to the fact that eight corners of each unit are usually cut away such as at 7, 8, 9, 10, etc., and then the corners are closed by metal closure plates 11, 12, 13, 14, etc. These units may be made airtight if desired, as is at once understood.

The continuous elongated members or stringers have a planar portion parallel to and engaging a wall of a box-like element or unit along a longitudinal corner of the element.

The units such as 1, 2, are spaced a short distance apart longitudinally in each group of associated units, as shown at 16 in Fig. 3 and a means is used such as links 133, and pins 134, Figs. 18 and 17, as will be described hereinafter with or without the tie rods 17, 18, and the yokes 19, 19, for holding the pontoon units together transversely with respect to said group. The yokes 19, 19, etc., press against the outer side walls 20, 20, of the outer row of pontoon units and rods 17, 18, may be tightened by a coupling device such as 21, Fig. 4, to bring a transverse row of units such as 1, 5, and 6a, Fig. 1, into closely locked and binding relations transversely. The rods 17, 18, etc., are jointed and can be slid down in the spaces 16, 16 from the deck 22 of the barge, between the units such as at 1, 2, Figs. 2, 3, and 4, into their final and lowermost position as seen in Fig. 4.

With regard to the means used to hold the longitudinal stringer angles such as 60, shown in Figs. 22 and 23, the link 133, which is shown in detail in Fig. 18, may be passed through the adjacent flanges of said stringer angles and a pin 134 passed through the hole 140 in said link and through an aperture 140a, in the horizontal flange of the stringer angle 60a and a driven fit obtained by means of the arcuate surface 141 of the pin 134.

When a plurality of strings of pontoons are assembled on land, it will be seen that instead of the tie rods 17, 18, and yokes 19, 19, etc., being used a similar arrangement of parts to that just described in connection with Fig. 23, may be used to tie the adjacent bottom stringer angles 15, together. (See Fig. 4.)

When the adjacent strings of pontoons are assembled to form a barge after the said strings are launched, it is evident that it is less convenient to use links and pins, 133 and 134, to fasten the lower stringer angles 15, together and in this case, resort is made to the use of the tie rods 17, 18, and the yokes 19, 19, etc., as before described.

After the tie rods are in position between each pair of units, the spaces 16, 16, are closed by top, side and bottom closure plates, 23, 24, 25, respectively.

The top and bottom stringer angles or continuous elongated members 60 and 15, the tie rods, 17, 18, the links 133 and pins 134, and the closure plates 23, 24, 25, all combine to make any group of the pontoon units into a very strong, overall structure, which can be used as a barge, a bridge, a wharf, a floating drydock, or a landing ramp such as is shown in Fig. 7 of the drawings.

Figure 2:
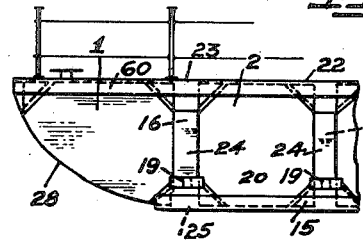
Fig. 2 is a longitudinal and partial side elevation of Fig. 1.
Figure 3:
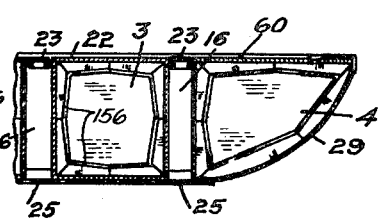
Fig. 3 is a longitudinal and partial cross-section of Fig. 1 on line 3—3 of Fig. 1.
Figure 4:
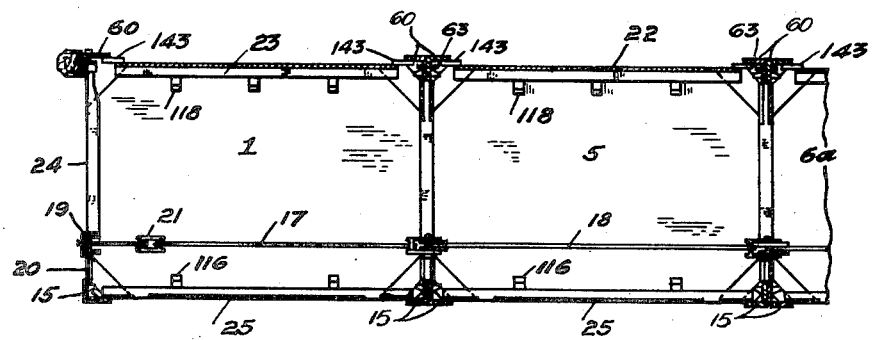
Fig. 4 is a transverse and partial section on line 4—4 of Fig. 1.

The appearance of the side of a barge is shown in Fig. 2, clearly, and it will be seen that the end rows of pontoon units such as 1, 5, 6a and 4, 5, 6a in Figs. 1, 2, and 3 of the drawings are of a special shape or form as shown, with a rounded surface 28, 29 to provide a bow and a stern for the barge. These end units are quite similar to the inside pontoon units 2, 3, etc., except for their rounded construction at 28, 29.

It will be evident that one group of units of any size such as the group of Fig. 1, may be hingedly connected to a rearward group of units (not shown) of equal or any other size, and yet form a single craft which can thereby adapt itself to "rough" water in which the barges may be needed. Any suitable hinge arrangements may be used between a forward and a rearward group of pontoon units. It is customary when making a barge of very long length that the individual groups similar to Fig. 1, be made rigid as a structure for 130 to 140 feet in length; and by hingedly uniting a number of groups of said length, make up a very large barge of any desired length or size, as can be readily understood. The barges may be power driven by any suitable means, of which outboard motors are one example.

Building up a group of units to make a barge is commonly started by making a rigid single "string" of units such as 1, 2, 3, 4, Fig. 1. These separate strings may be made up on land and then launched endwise or sidewise into the water as most convenient. After two or three or more of the strings of units are afloat they can be secured together while afloat to form any width of barge desired. This is found to be a very convenient feature of the present invention. It is evident that any number of "strings" of units can merely be brought side by side in the water and lashed temporarily together, the links 133 and pins 134 used to fasten the upper stringer angles together, and the jointed tie rods 17, 18, etc., inserted between each succeeding and adjacent transverse rows of pontoons, the tie rods lowered to the lowest position, as shown in Fig. 4, and tightened up, thus completely tying together as many strips of pontoon units as desired, and forming barges of any size desired.

Bridge, wharf and ramp unit assemblies

Bridge units are built up substantially as in the case of barges, except it is not necessary to have the pontoon units airtight as usually they are to be used while out of the water, and do not need special description, except that in some cases where they are used as a wharf with a landing ramp such as 35, Fig. 7, and in order to keep the horizontal alignment of the deck of both wharf and ramp even, as at 36, a special type of connection between the wharf unit portion 37 and the ramp 35 is used, which comprises at each side 38, 39 of the structures a wood bumper 40 mounted between the ends of the wharf unit, and the ramp to keep these parts spaced apart, and flexible tension members comprising a pair of crossed cables 41, 41 which last are mounted in the stringer angles 60 and 15 of the wharf unit and ramp, as shown.

When the ramp 35 rests on the shore 44, the end 45 of the ramp is of course raised somewhat, but the cables 41, 41 being arranged as they are shown in Fig. 7, tend to keep the ends of the wharf unit and ramp in substantially horizontal surface alignment at points 38, 39 as is at once seen.

Any unusual or emergency strain which would rupture the cables 41, 41 or their connections, is provided for by the use of cables 41a and connection lugs 47, 47 on the decks of the ramp and wharf unit to prevent the floating portion being separated from the grounded portion, as shown in top plan view in Fig. 6 and in side elevation in Fig. 7.

Pontoon floating drydocks

In Figs. 8, 9, 10 are shown a plan, side elevation, and an end elevation of a drydock built up of airtight pontoon units in which the buoyancy of the airtight units is used to advantage as well as the structural strength of the combined units, as heretofore emphasized in this specification. In Fig. 8 is shown a floating drydock 51a which is composed of a multiplicity of airtight units 51, 52, 53, 54, 55, 56, etc. connected up to form the body portion 57 of the dock, which is identical in construction to a barge as heretofore described. The body portion 57 provides the "boat" or floating part of the drydock, and normally floats like a barge in the water. The end units 51, 52, 53, 54 may be square-ended as shown in Figs. 8 and 9, or may be of curved type such as 1 and 4, shown in Figs. 1 and 2 of the drawings.

The longitudinal strings of units such as 51, 58, 53, 59 are all fastened together using the continuous stringer angles 60 and 15 with connections identical with the barge type of construction above described. Similarly, the transverse rows of airtight units such as 51, 52, 55, 56, etc., are held together transversely at 64, 65, 66, 67 by the transverse tie rods similar to 17, 18 of Fig. 4, and connections at 63 in said Fig. 4. The drydock is provided with a plurality of towers 68 to 75 inclusive, which are equal in number on the two sides as shown in Fig. 8 of the drawings. These towers are built up of airtight units such as 68, 76, 71, 77 as shown in Figs. 8 to 10 inclusive. The units in the towers are held assembled by being bolted together at the corners. It will be seen that when the body portion of the dock 57 is completely submerged in the water, in order to permit landing of a ship or vessel (not shown) on the deck 78, the towers still are airtight and buoyant and will prevent the drydock from sinking completely in the water, and also act as a balanced stabilizer for the dock.

Between the towers 76, 80 and 77, 81 are open spaces 82, 83 respectively, and between 80 and 81 a large space 86, as is readily understood. Space 82 is bridged by a short catwalk 84, and space 83 by another catwalk 85 preferably made of members such as I-beams or channels. The space 86 between the towers 80, 81 is bridged as seen in Fig. 9 by a light structural truss 86a due to the open span being greater than at 82 and 83. The purpose of the catwalk is, of course, to enable the workmen to get from one tower to another when the body portion 57 of the dock is submerged.

Fig. 10, which is an end view of Fig. 9, shows the arrangement of the towers transversely of the drydock. It will be noted that the unit 68 is supported on the body portion 57 of the dock by clip angles at points 87, 87 which are fastened to the stringer angle 60, Fig. 8 and Fig. 10; and the angle braces or supports 88 which are attached to the lower stringer angle 15, as shown in Figs. 9 and 10 and to the lower outboard edge of the tower.

It is quite evident that a "cradle" or "slip" 89, Fig. 16, may be mounted in between the towers 72 and 76 and on the deck 78 of the body portion 57 of the drydock, for the purpose of receiving the ship or boat being raised for repairs by the floating drydock.

In Figs. 19, 20, 21 of the drawings are shown the features of the floating drydock which relate to the submerging and emerging or raising of the body portion 57 of same in water by the introduction of water, and compressed air as needed, into the pontoons 51, etc. It will be seen in Fig. 20, which is a transverse skeleton section of the body 57 of the drydock, that along the length of the deck 78, and along each side thereof as in Figs. 19 and 20, there extends a double line 90, 91, 92, 93 of preferably metal pipes to carry compressed air. At 94 is shown a portion of a pontoon tender barge used with the dock 51a, for carrying air compressors 95, 96, 97 (usually in triplicate), for the purpose of supplying compressed air to the pontoons.

At 98 is a control manifold connected by hose pipes 99, 100 to the compressors and to the metal pipes 90, 91, 92, 93 such as shown in Fig. 19 clearly. In Fig. 20 are shown four pontoons, in the upper corners of which are ports 101, 102 for the admission of air into the pontoons. These ports are connected through flexible air hose 103, 104 with the longitudinal air lines 90 to 93 inclusive, as shown. It is evident that the compressed air supply can be controlled to the pontoons by means of the valves located near the compressed air manifold 98, such as 105, 106, and usually one-quarter of the number of pontoons used for the drydock are formed into a group which is controlled through pipes 90, or 92, so that if in the "sinking" or "raising" of the dock in the water, it is found that one particular corner portion of the deck or the dock is sinking too fast, the air to the pontoons forming one-quarter of the deck area may be controlled by the valves 105, 106, etc., near the manifold 98, as is at once understood.

In Fig. 20 also is shown a series of metal pipes 107, 108, etc., which are rotatably connected with ports 109, 110, etc. The open ends of these pipes 107, 108, etc., can be swung downward as indicated at 109a in dotted lines, so that water can be admitted through them into the pontoons, as soon as the air in said pontoons is released by opening the air valves 105 near the air compressors.

In this manner as the water enters the pontoons 58, etc., the drydock body 57 begins to settle or sink in the surrounding water, and the deck of the whole dock can be completely submerged. When the drydock has been lowered beneath the surface to the depth desired all the air valves 105, etc., are closed. Back pressure will then develop in the pontoons and prevent any additional inflow of water. Any loss of air pressure in the pontoons due to leaks in the air hose can be compensated for by pumping air into the pontoons from the compressors, in order to keep the drydock at the level or elevation in the water, desired. A boat or ship can then be floated between the towers 76, 72 of the dock and on to the cradle 89, Fig. 16, or otherwise supported on the deck 78.

Thereafter compressed air is forced into the pontoons 58, etc., forming the deck 78, through pipes 91, 90, 92, etc., and 103, 104 and the water which has entered the pontoons is forced out of them through pipes 107, 108. The ends of the latter are raised above the water line, to prevent the admission of water to the pontoons when the dock is in its raised position. Thus according to the amount of air forced into the pontoon, the deck 78 of the dock can be raised to any desired height, preferably about six inches freeboard above the water surface surrounding the dock. After repairs to the boat, etc., the deck is again submerged by opening the air lines, and admitting water through pipes 107, 108, the latter having been revolved about 109, 110 so their ends are again submerged. After the boat is floated off the deck 78 the dock can be raised once more to a position above the water surface. The detail shown in Fig. 21 shows method of mounting pipes 90, 92, etc., by means of a bent metal strap 111 hooked over the longitudinal stringer angle 60.

The pipe feed lines 90, 91 are usually made about two inches in diameter as well as the feed hose lines 99, 100, etc. It is important that all the inlets 101, 102 face in the same direction. The air hose lines 103, 104 of course are located between the ends of adjacent pontoons.

Floating cranes

It is evident the pontoon barges before described are well adapted to carry a lifting crane (not shown), usually having a crawler base, and which can be secured to the barge by means of lashing cables, attached to the base of said crane. Such movable crawler base cranes are easily placed on the pontoon barge from the shore, or from a wharf. In the case of an extra heavy crane the barge may "trim" or list towards the crane end of the barge, and in order to obtain a level deck the pontoons at the opposite end of the barge can be ballasted. Ballasting is necessary only in case of very heavy cranes. Clam-shell buckets and long eighty foot booms may be used on the cranes, and complete circular travel of the crane and boom may be made. A load of twenty-one tons has been lifted with a sixty-foot boom; and a load of fourteen tons has been lifted using an eighty-foot boom, by cranes carried on pontoon barges of the type of the present invention.

Details of the invention in hand are as follows:

Box-like units

In Fig. 11 is shown a perspective view of one of the box-like units which form the foundation or basic idea of the present invention. The numeral 6 represents a preferably metal box which is substantially rectangular in shape, the eight corners of which are cut off at an angle as shown at 7, 8, 9, 10. These corners are then closed by a separate plate closure such as 11, 12, 13, 14 placed obliquely across the corners as shown so as to make the unit in some cases airtight. In practice the closure plates 11, 12, 13 and 14 may be welded in and made airtight by means of a welded seam around their edges. The corners 7, 8, 9, 10 are then closed on two sides of the unit 6 by metal corner plates 11a, 12a, 13a, 14a. These plates just named do not close the triangular openings 114, 114, etc., since the purpose of these openings is to permit placing of wedge. and wedge fastening means therein as described below. In the box-like unit 6 are provided apertures 109 which furnish a means of filling the units in some cases with water by attaching thereto metal pipes such as 107, 108 shown in Fig. 20, as before described in the specification. The apertures 101, 102 are also used for filling the interior of the box-like units with compressed air by means of connections such as 103, 104 shown in Fig. 20 of the drawings and before described.

On the ends of the unit 6 also appear lugs 118, 116 which are used as supports for closure plates 23, 25 before mentioned herein.

*Wedge connections between the units and longitudinal stringer angles*

Figure 12:
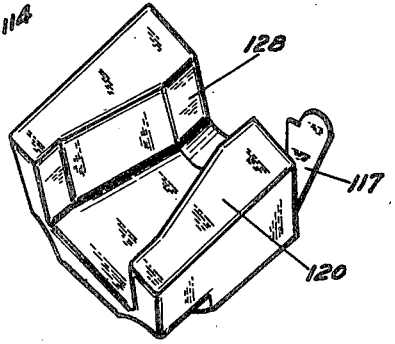
Fig. 12 is an enlarged perspective view of a wedge used with the invention.
Figure 13:
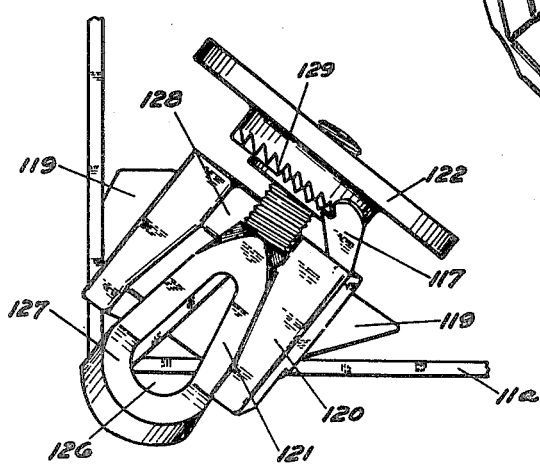
Fig. 13 is an enlarged view of an assembly of a wedge guide, a wedge, wedge bolt, and handwheel nut used with the invention.

It will be seen in Figs. 11, 14 and 15 that on the inner corner faces of the corner plates 12 are secured lugs or wedge guides 119 extending into the openings 114. These lugs coact with special shaped wedges 120, Figs. 12, 13 and 15, and wedge bolt 121 and a wedge bolt handwheel nut 122, and with the wedge bars 123. The wedge bars are rigidly mounted on the inner faces of the flanges of the stringer angles 60, and 15 and are each provided with a downwardly extending pin 124 on the under side 125 of said wedge bars 123, in the position of the stringer angles 60 as shown in Figures 14 and 15. The face 123a of each wedge bar 123 nearest the box secured thereby is undercut and a portion of said pin or projection 124 is disposed upon said face 123a substantially in the manner shown in Figures 28 and 28a, the said pin or projection 124 extending toward the vertex of the angle between the sides of the stringer members. The wedge 120 has two flat surfaces facing upwardly, as shown in Figure 12, which cooperate with the undercut face 123a of the wedge bar 123. The flat end face of the wedge bolt handwheel nut 122, shown just below ratchet teeth 129 in Figure 13, comes in contact with the flat end of the wedge 120 and forces the wedge into wedging position when the handwheel nut is tightened. In Fig. 13 it will be noted that there is a pawl 117 mounted on the end of the wedge 120. Said pawl engages in the teeth 129 and prevents retrograde movement of the nut on the bolt. In this way the box-like units 6 are brought individually into close fitting relation with the stringer angles 60 and 15.

In addition to the means just described for securing the pontoon units individually on the stringer angles 60 and 15 a second means is provided for the same purpose, to wit, holes 130, 130 are made in the stringer angles and complementary holes 132, 132 are also made through the corner plates 12a of the pontoon 6, Fig. 11, and the bolt 131, Fig. 14, is placed through the said holes 130 and 132, and with a nut 132a thereon.

In the Figs. 22 and 23 of the drawings, as well as in Figs. 17 and 18, is shown a link 133 and pin 134 which are used as follows in the present invention. When two pontoons (Fig. 22) such as 135a and 136a, are placed in advance of two other pontoons 135, 136 respectively, it is seen that the longitudinal stringer angles 60 are made continuous from the forward set of pontoons to the rearward set, and also are placed in a "back to back" relation with respect to each other, as shown in Figs. 22, and 23 of the drawings. In order to secure the said angles 60 together in "back to back" position the link 133 (Fig. 18) which is provided with a head 139 is used and passes through the vertical flanges of the said longitudinal stringer angles 60 as shown in Fig. 23. Also the link 133 is provided with an aperture 140, and pin 134 is passed through the horizontal flange of one angle 60 and enters the aperture 140 of the link 133, and the said pin is provided with an inclined or arcuate face 141, so that a "driven fit" is obtained by the pin in the aperture 140. This arrangement insures the two angles 60 being securely locked together. In Fig. 22 also note the bolts 142, 142 which pass through the stringer angles 60 and through the corner plates 11a, 12a, 13a, 14a (see Fig. 11) of the units 6, in order to secure the stringer angles and the pontoons together.

In Figs. 3, 4 and 22, the closures 23 on the top and 25 on the bottom of the barges, respectively, close the space between the ends of the pontoons in a transverse direction of the barge. It will be noted that the downwardly extending flanges of the channels 23 rest against the lugs 118, 118 on the pontoons 6, as shown in Fig. 11, and on the end of the said channels are small plates 143, 143, Fig. 22, which lie partially beneath the stringer angles 60 and a bolt 144 keeps said closure channels 23 from displacement, once they are in position between the ends of adjacent pontoons. The closures 25 abut the lugs 116, 116 (Fig. 11) in similar fashion to that just described, on the bottom of the pontoon, as seen in Fig. 11. On the sides of the adjacent pontoons are also the vertically disposed closure plates 24, 24 as shown in Fig. 2 of the drawings and for a similar purpose of closing the space between the pontoons.

*Breech plug splice*

In Figs. 26, 27, 28 and 29 are shown views of what is called a "breech plug splice," which is used to connect the ends of two longitudinal stringers or assembly angles 60 together. The female breech plug 148 is formed as shown with a toothed arced opening 149 in the end of same, and said breech plug usually is butt-welded against the stringer angle 60 as clearly shown in the drawings. In Fig. 27 the male part of the breech plug 150 is similarly butt-welded at 151 to the end of the longitudinal stringer angle 60 and said breech plug has a male extension 152 formed thereon with a plurality of outstanding projections 153, 153 formed integral preferably with the breech plug extension 152. It is clear that the extension 152 of the breech plug 150 is adapted to enter the female part of the breech plug 148 and is formed complementary thereto. Provision is made to prevent turning of the extension 152 after it has been placed in the breech plug 148 by means of a screw-bolt 154 (Figs. 28 and 29) which passes through the plug 148 through a screw-threaded recess and enters a recess 155 formed in the male extension 152 of the male plug 150.

It is evident that the male extension 152 with projections 153, enters the toothed arced opening 149 so that the projections named enter through the complementary recesses 153a, 153a, etc., and after the extension 152 reaches its seat, the extension 152 is given a slight turn of revolution until the parts 153, 153, etc., are placed in engagement and alignment with complementary outstanding prongs 153b, 153b, etc., and the screw-bolt 154 is in registration with the hole 155 in the extension 152. It is apparent that the lugs 153 and their counterparts in plug 148 must be designed to provide sufficient resistance to shear equal to at least the cross-sectional strength of the angles 60 in tension and compression.

Figure 28A:
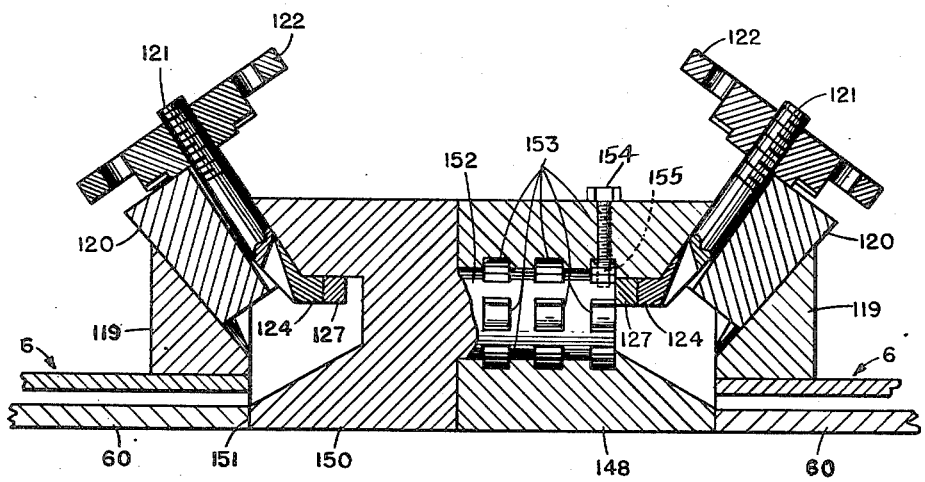
Fig. 28a is a diagonal sectional view of the structure of Figs. 28 and 29 with the wedges, wedge bolts, wedge guides and box units in place in the angle of the elongated stringer members.

Attention is called to the pins 124, 124 which appear in Fig. 28 and are the same as those shown and described in connection with Figs. 14 and 15 of the drawings. Fig. 28a is a diagonal sectional view of the structure of Figs. 28 and 29, substantially bisecting the angle of the elongated stringer angle members and showing the wedges 120, wedge bolts 121, wedge hand wheels 122, and the wedge guides 119 in the corner plates of the box units 6, applied with the angularly bent loops 127 of the wedge bolts hooked over the pins 124, and lying against the inclined side or wedge bar surface of the splice bars or breech plug members. As shown in original Fig. 28, and in Fig. 28a, the pins 124 are disposed upon and extend partially from the inclined side or wedge bar surfaces of the splice bars or breech plug members and partially from the substantially horizontal under surfaces of said splice bars or breech plug members.

The breech plug splice, it is evident, may be used in any place where it is desirable to interlock or connect the two ends of any assembly angles together. The breech plug splice, however, is particularly useful when a plurality of pontoons are assembled such as those shown in a group in Fig. 1 of the drawings, and in which six pontoons form an over-all length of thirty-four feet, nine inches. In this case where it is desired to make a barge more than seven pontoons long, the ends of the stringer angles 60 and 15 are joined to those of the adjacent barge by use of the breech plug splice shown in Figs. 26 and 27. This breech plug device is considered very useful in cases where a barge is desired of more than thirty-five feet in length, in which case a barge about that length is joined by means of the breech plug splice on the stringer angles to a second barge of any length desired, and the two thus create a single unit or barge of much longer proportions.

*Wedge angle-splice*

In Figs. 25, 30, 31 and 32 is shown an alternate type of angle splice which performs a similar function to the breech plug splice above described. The purpose of the wedge angle-splice is to securely fasten together the ends of two stringer angles 60, 60 shown in Figs. 25 and 30 and comprises the following parts.

It will be noted that the Figs. 25 and 30 show the ends of two stringer angles 60, 60 which are provided with a pair of wedge bars 123, 123 mounted thereon, and said wedge bars have been described above in this specification. Adjacent to the wedge bars 123, 123 on said angles 60, 60 are interlocking parts 161, 162 which are preferably butt-welded at points 163, and 164 respectively to said angles. The female part 161, comprises a solid piece of metal shaped substantially in the form of an angle and having therein an interlocking recess 165 which extends around the block or part 161 exteriorly thereof.

Figure 31:
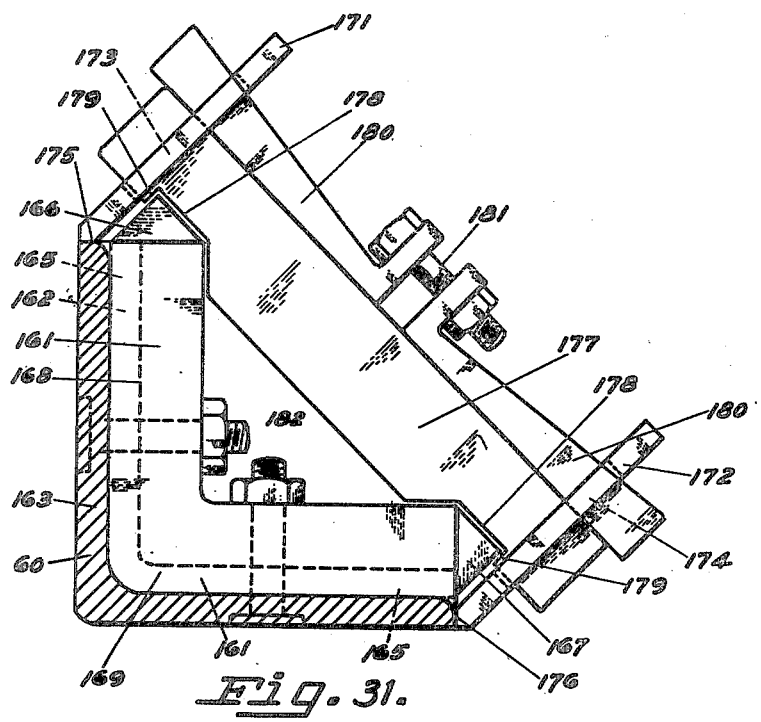
Fig. 31 is a transverse vertical section taken on line 31—31 of Fig. 25.

Formed preferably integral with said block 161 are a pair of angular projections 166 and 167 clearly shown in Figs. 25 and 31 of the drawings. In the Fig. 30 is shown the male part or member 162 which interlocks with the block 161. On the part 162 are shown a pair of raised and curved ribs 168, 169 which are mounted on a rear plate portion 170 of said part 162.

It will be noted that the parts 161 and 162 as above mentioned are welded to their respective angles 60, 60 as shown at 163 and 164 of Figs. 25 and 30 of the drawings. The ribs 168 and 169 are formed complementary to the recess 165 of the block 161 and interlocks with said recess as is at once understood. On the edges of the plate portion 170 of the part 162 are formed a pair of wing plates 171 and 172 each of which have an aperture 173 and 174 respectively. The two wing plates 171 and 172 are preferably welded to the edges of the plate portion 170 at points 175 and 176.

In the Fig. 31 is shown an assembly of the block 161 and part 162 in interlocked position and it will be seen therefrom how the above described parts are fastened together. The locking bar 177 is adapted to enter recesses 173 and 174 in the wing plates 171 and 172 and said bar is provided with a pair of notched recesses 178, 178 which are adapted to engage over the angular projections 166 and 167 at points 179, 179 as clearly shown in Fig. 31.

The apertures 173 and 174 are also made large enough to receive the wedges 180, 180 and it will be seen that said wedges when drawn together by means of a bolt 181 securely lock the locking bar 177 into engagement with the angular projections 166 and 167 of the block 161. In this way, the two parts 161, 162 and the angles 60, 60 are securely held together by means of the interlocking engagement of the ribs 168, 169 with shoulders 183 in the recess 165, and the wing plates 171 and 172 with appurtenant parts just described.

In addition to the means just described for locking the parts 161 and 162 together, it will be seen that a further securing device is used comprising the screw-bolts 182, 182 which pass through both of said parts 161 and 162 as shown.

Figure 32:
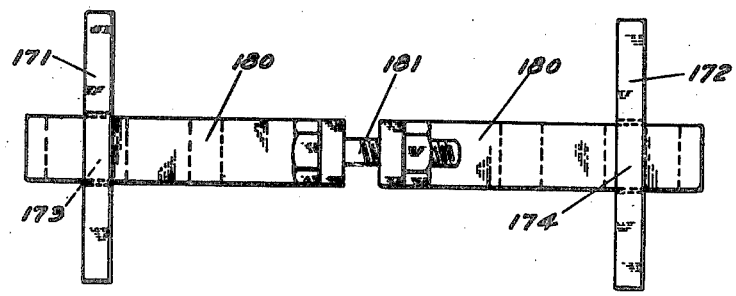
Fig. 32 is a front view of a pair of wedges and locking bar shown in Fig. 31 and taken from the right thereof.

The Fig. 32 of the drawings shows in plan view the arrangement of the wing plates 171 and 172 and the wedges 180, 180 and tightening bolt 181 clearly.

The present invention provides a structural frame consisting of box-like elements which are clamped or mounted between four structural members or angles located along the four longitudinal corners of said elements.

The same arrangement of parts is adapted to provide a hull for a floating structure, and the flotation features of the airtight units provide complete buoyancy for said hull, in addition to the great strength provided by the device considered as a structural framework, adapted to resist torsion as well as shear and bending moments.

The boxes act as the web of a girder, and the structural members or longitudinal angles act as the top and bottom chords of a girder to give any desired amount of bending strength to the structure as a whole. These last features, it is easily seen, enable the invention to be used as a bridge structure, viaduct, towers or the like.

The invention in hand provides a set of standardized structural and flotation units suitable for assembly in various forms such as lighters, floating landing stages, bridges, floating drydocks, wharves, barges, and like structures.

Figs. 3 and 5 of the drawings illustrate the means of strengthening the interior of the pontoons. These features include transverse frames 156 having a cross-section substantially in the form of a T, as clearly illustrated. The end walls 157, 157 of the pontoon may be stiffened and strengthened a number of ways, one of which is illustrated in Fig. 5, the members 158, 158 being made of greater depth at 159 of the members than at the ends 160 of said members 158. In other cases (not shown) the stiffening and strengthening of the box-like units is accomplished by placing gusset plates at the inside corners of the pontoon, and similar equivalent means may be devised for the purpose in hand.

The box-like elements of the present invention are so "standardized" that quick assemblage of any of these structures with few tools, can be made quickly in distant parts of the world, where machine tools are few, and other great disadvantages in constructing the devices named prevail. That the named devices can also be disassembled very quickly and the "standardized" parts used can be quickly transported to other parts of the world where similar structures may be needed. It is unnecessary to point out that the present invention has great value in war periods, where speed in construction and disassemblage of such structures is "of the essence" of the military and naval requirements. The invention described herein may be manufactured by or for the Government of the United States of America for governmental purposes without the payment of any royalties thereon or therefor.

I claim:

1. In a device for securing a box-like unit to a longitudinal member, a wedge bar mounted on the latter, a downwardly extending pin on the wedge bar, a beveled wedge guide on the said unit, a wedge-bolt having a bent looped end in engagement with the said pin, a wedge member in engagement with the wedge guide and having an inclined recess therein adapted to receive the stem of the wedge-bolt, and a lock nut on the wedge-bolt in engagement with the end of the wedge, said device being adapted to draw the longitudinal member and the box-like unit into close and fixed relation with each other.

2. In a device for securing two constructional elements together, a structural member, a centrally positioned member adapted to be mounted thereon, a pair of opposed wedge guides each having a bevelled face thereon, and each mounted on an opposite end of the central member, a pair of diagonally faced and opposed wedges each in engagement with a bevelled face of a wedge guide, and connected with the said structural member, and means for adjustably locking the wedges into wedged relation with the wedge guides, whereby the central member is wedged at both ends into adjustably locked relation with the said structural member.

3. In a device for securing a box-like unit having a pair of opposed exteriorly accessible recesses formed in the opposite end faces of said unit to a stringer member, a diagonally inclined wedge guide mounted in each recess, a pair of wedge bars each mounted on the stringer member in proximate relation to one of the wedge guides, a pin on each wedge bar, a wedge in engagement with each wedge guide, and each having a recess therein, a pair of threaded wedge bolts each having a loop which encloses one of the wedge bar pins, and each adapted to be mounted in one of the wedge recesses, a wedge bolt nut on each bolt having a circumferential set of teeth thereon, and mounted on the threads of the wedge bolt, and adapted to engage against a face of one of said wedges, and a pawl mounted on each wedge, in engagement with the teeth of the wedge bolt nut, and adapted to prevent retrograde movement of the nut on the threads of the wedge bolt, all for the purpose of forming a pair of wedge-like opposed means for securing both ends of the box-like unit on said stringer member.

4. A structure as described, comprising strings of alined box-like elements, an angle member embracing each series of alined corners of said elements and means for locking together corresponding angle members on two strings including a female breech plug on the end of one member having a longitudinal recess therein, a plurality of radial projections formed in said recess with recesses therebetween, a male breech plug on the end of the second member, an extension on the male breech plug adapted to enter the female plug recess, and a plurality of embossed projections on said extension formed complementary to the projections and recesses of the female breech plug.

5. A structure as described, comprising strings of alined box-like elements, an angle member embracing each series of alined corners of said elements and means for locking together corresponding angle members on two strings including a female breech plug having a longitudinal recess therein, mounted on the end of one member, a series of radially and arcuately disposed projections formed in the longitudinal recess, a complementary male breech plug on the end of the second member, a cylindrical extension on the male breech plug adapted to enter the female breech plug recess, and a series of embossed radially and arcuately disposed projections on the said extension formed complementary to the projections and recesses of the female breech plug.

6. A structure as described, comprising strings of alined box-like elements, an angle member embracing each series of alined corners of said elements and means for locking together corresponding angle members on two strings including a female breech plug having a longitudinal recess therein mounted on the end of one member, a series of radially, arcuately and alternately positioned projections formed in the longitudinal recess, said adjacent projections having recesses formed between them, a complementary male breech plug mounted on the end of the second member, a cylindrical extension on the male breech plug adapted to enter the female breech plug longitudinal recess, and a series of embossed radially and arcuately disposed projections on said extension formed complementary to the projections and recesses of the female breech plug recess.

7. An assembly as described, comprising a plurality of closed inherently buoyant elements disposed adjacent each other in a row, each element having a plurality of mutually parallel rectilinear edges and having all corners truncated, a plate secured thereto at each corner to close the opening left by truncating the corner, a member secured to the element at each corner to complete the form of the corner while leaving an accessible recess between said member and the adjacent said plate, the corresponding said edges of all the elements being aligned, a rigid angle member fitted on each series of aligned edges, a respective wedge bar fixed to each said angle member adjacent each corner of each element, the face of each wedge bar next the adjacent element sloping away from the element, a pin carried by the said wedge bar, said pin projecting toward the angle member, a wedge guide secured to each corner member in said recess, a securement bolt having a loop at one end and a threaded shank, the end of said loop being laterally bent and engaged with the said pin, a wedge disposed in each said wedge guide having a cut out portion to receive a said bolt, and a nut threadedly engaged with said shank to impel said wedge between the wedge bar and the wedge guide to apply thrust to said wedge guide to bind the edge of the element fixedly to said angle member.

8. An assembly as described, comprising a plurality of closed inherently buoyant elements disposed adjacent each other in a row, each element having a plurality of mutually parallel rectilinear edges and having all corners truncated, a plate secured thereto at each corner to close the opening left by truncating the corner, a member secured to the element at each corner to complete the form of the corner while leaving an accessible recess between said member and the adjacent said plate, the corresponding said edges of all the elements being alined, a rigid angle member fitted on each series of alined edges, and means at each corner of each element to bind the element fixedly in the angle member including a wedge and means to impel said wedge to apply thrust against the adjacent said corner member, said wedge and said impelling means being disposed in said recess.

9. An assembly as described, comprising a plurality of closed inherently buoyant elements disposed adjacent each other in a row, each element having a plurality of mutually parallel rectilinear edges and having all corners truncated, a plate secured thereto at each corner to close the opening left by truncating the corner, a member secured to the element at each corner to complete the form of the corner while leaving an accessible recess between said member and the adjacent said plate, the corresponding said edges of all the elements being alined, a rigid angle member fitted on each series of alined edges, and means in each said recess in each element to bind the element firmly in the angle members including a bolt connected to an angle member and having a threaded portion, a nut threadedly engaged with said portion, and a wedge disposed between said bolt and said corner member to be impelled by said nut when screwed on said bolt to exert thrust against said corner member to bind the corner member and element firmly in the angle member.

10. A string of box-like elements, each having a cut away portion at each corner, four mutually parallel edges and a diagonally disposed closure plate secured to the three sides of the element meeting at each corner to complete the enclosure of the space within the element, said elements being disposed adjacent each other with corresponding said edges alined, a rigid angle member extending the length of said string fitted on each series of said alined edges, and means fixedly connecting each said element to all said angle members to produce a structural unit wherein all said elements and said angle members cooperate to resist as a unit stresses applied to the assembly.

11. A string of box-like elements, each having a cut away portion at each corner, four mutually parallel edges and a diagonally disposed closure plate secured to the three sides of the element meeting at each corner to complete the enclosure of the space within the element, said elements being disposed adjacent each other with corresponding said edges alined, a rigid angle member extending the length of said string fitted on each series of said alined edges, and securing means at each corner of each element to fix the element to the angle members, said securing means including a device engaged with the adjacent angle member, wedge means impelled by said device, and means fixed to said element against which said wedge means exerts a thrust toward the adjacent angle member.

12. A flotation structure comprising a plurality of unitary assemblies, each said assembly comprising a plurality of box-like elements disposed in a row, each said element having a plurality of mutually parallel edges, the corresponding side edges of all said elements being alined, a rigid longitudinal angle member fitted over and firmly bound against each series of said alined edges by means binding each of said elements individually to said angle members, all said elements and angle members in each row cooperating to resist as a girder unit stresses applied thereto, and means rigidly securing said unitary assemblies together in side by side relation so that the entire structure resists as a unit stresses applied thereto.

13. A flotation structure, comprising a plurality of unitary assemblies, each said assembly comprising a plurality of box-like elements disposed in a row, each said element having a plurality of mutually parallel edges, the corresponding said edges of all said elements in each row being alined, a rigid longitudinal angle member fitted over each series of said alined edges, means at each corner of each element binding the element individually to the angle member in which such corner is fitted, all the elements and angle members in each row cooperating to resist as a girder unit stresses applied thereto, and means rigidly securing said unitary assemblies together in side by side relation so that the entire structure resists as a unit stresses applied thereto.

14. A dry dock, comprising a plurality of independently buoyant hollow box-like elements rigidly secured together in rows, means rigidly securing said rows together in side by side relation to form a unitary structure having a substantially flat surface, a plurality of said elements securely anchored to said structure substantially at the level of said surface and extending above said surface along each of two opposite sides of said structure, and means to admit water to and expel it from the elements constituting said structure, to cause at will said structure to submerge to a desired depth or to float.

15. A dry dock, comprising a plurality of fully interchangeable independently buoyant box-like elements rigidly secured together in rows, means rigidly securing said rows together in side by side relation to form a unitary structure having a substantially flat surface, and a plurality of said elements securely anchored to said structure substantially at the level of said surface and extending above said surface along each of two opposite sides of said structure.

16. A box-like element having all its corners truncated, a plate secured thereto at each corner to close the opening left by truncating the corner, and a member fixed to the element at each corner to restore the form of the corner while leaving an exteriorly accessible recess between said member and the adjacent said plate.

17. A box-like buoyant element having formed at each corner a recess accessible from the outside of the element, and a closure portion joined to the three sides of the element meeting at each corner between the recess and the interior of the element to complete the enclosure of the space within the element.

18. A girder, comprising side members extending the length of the girder and a web joining the side members, said web consisting of separate polyhedral elements disposed with spaces between them, the spaces being spanned by said side members only, each said element having edges parallel to the side members and other edges extending between the side members, said side members comprising stringer angles embracing and overlying said parallel edges of said spaced elements, the said side member stringer angles having their cross-sectional center lines passing through said spaced elements in close proximity to the respective parallel edges of the elements.

19. An assembly comprising a box-like unit, a member disposed against an edge thereof, and means to secure the unit to the member including a part fixed to said unit providing a sloping surface so disposed that pressure thereon urges the unit toward the member, a part fixed on said member adjacent the said part on the unit providing a cooperating surface converging toward the aforesaid sloping surface, a wedge insertable between the said two surfaces, means to force said wedge between the two surfaces, and means connected to said member to resist displacement of the unit along the member due to action of the wedge.

20. In combination in a structural assembly, a plurality of box-like elements disposed in a row, and elongated means extending longitudinally of said row and continuously along aligned surfaces of said plurality of box-like elements, means extending between each of said plurality of box-like elements and the said continuous elongated means and rigidly securing each box-like element of said row individually to said continuous elongated means, said continuous elongated means comprising an elongated member having a planar portion and rigidly secured, by said securing means, in engagement with said box-like element along a longitudinal corner of said element, with said planar portion being parallel to and engaging one wall of said boxlike element forming said longitudinal corner and disposed in a plane substantially at right angles to the other wall of said element forming said longitudinal corner and overlying the edge of said other wall forming said longitudinal corner of the element.

21. In combination in a structural assembly, a plurality of box-like elements disposed in a row, and elongated means extending longitudinally of said row and continuously along aligned surfaces of said plurality of box-like elements, means extending between each of said plurality of box-like elements and the said continuous elongated means and rigidly securing each box-like element of said row individually to said continuous elongated means, said continuous elongated means comprising at least one pair of elongated members, each elongated member of said pair having a planar portion parallel to that of the other member of said pair, said parallel planar portions of said pair of continuous elongated members lying against parallel opposite walls of each of said box-like elements in rigid securement by said securing means with said box-like element and extending substantially at right angles to the connecting wall of the box-like element and overlying the said connecting wall at the corresponding longitudinal corners of the box-like element, providing a rigid structure capable of functioning as a girder, the said pair of continuous elongated members being connected together only by said box-like elements and by said securing means, and comprising girder flange or chord means capable of transmitting and sustaining tensile and compressive forces of bending and substantially relieving the box-like elements of such main flange stresses, and the box-like elements comprising girder web means transmitting and sustaining shearing stress in said rigid girder structure.

22. In combination in a structural assembly, a plurality of box-like elements disposed in a row, and elongated means extending longitudinally of said row and continuously along aligned surfaces of said plurality of box-like elements, means extending between each of said plurality of box-like elements and the said continuous elongated means and rigidly securing each box-like element of said row individually to said continuous elongated means, said continuous elongated means comprising at least one pair of elongated members, each elongated member of said pair having a planar portion parallel to that of the other member of said pair, said parallel planar portions of said pair of continuous elongated members lying against parallel opposite walls of each of said box-like elements in rigid securement by said securing means with said box-like element and extending substantially at right angles to the connecting wall of the box-like element and overlying the said connecting wall at the corresponding longitudinal corners of the box-like element, said box-like elements being spaced apart a substantial distance in said row, said continuous elongated members spanning the spaces between said elements, providing a rigid structure capable of functioning as a girder, the said pair of continuous elongated members being connected together only by said box-like elements and by said securing means, and comprising girder flange or chord means capable of transmitting and sustaining tensile and compressive forces of bending and substantially relieving the box-like elements of such main flange stresses, and the box-like elements comprising girder web means transmitting and sustaining shearing stress in said rigid girder structure.

23. In combination in a structural assembly, a plurality of box-like elements disposed in a row, and elongated means extending longitudinally of said row and continuously along aligned surfaces of said plurality of box-like elements, means extending between each of said plurality of box-like elements and the said continuous elongated means and rigidly securing each box-like element of said row individually to said continuous elongated means, said box-like elements each being provided with recesses one at each end of each longitudinal corner of the box-like element, said means for rigidly securing each box-like element of said row individually to said elongated members comprising securing means extending between said elongated members and said box-like element and into said recesses at each end of the corresponding longitudinal corners of the box-like element, said securing means being accessible for individual adjustment by means of said recesses, said continuous elongated means comprising at least one pair of elongated members, each elongated member of said pair having a planar portion parallel to that of the other member of said pair, said parallel planar portions of said pair of continuous elongated members lying against parallel opposite walls of each of said box-like elements in rigid securement by said securing means with said box-like element and extending substantially at right angles to the connecting wall of the box-like element and overlying the said connecting wall at the corresponding longitudinal corners of the box-like element, providing a rigid structure capable of functioning as a girder, the said pair of continuous elongated members being connected together only by said box-like elements and by said securing means, and comprising girder flange or chord means capable of transmitting and sustaining tensile and compressive forces of bending and substantially relieving the box-like elements of such main flange stresses, and the box-like elements comprising girder web means transmitting and sustaining shearing stress in said rigid girder structure.

24. In combination in a structural assembly, a plurality of box-like elements disposed in a row, at least one pair of angle members extending longitudinally of said row and continuously along aligned surfaces of said plurality of box-like elements and receiving in each one of said pair of continuous angles one of a pair of longitudinal corners of each box-like element, means extending between each of said plurality of box-like elements and each one of said pair of continuous angles and rigidly securing each box-like element of said row individually to said continuous angles, providing a rigid structure capable of functioning as a girder, the said pair of continuous angle members being connected together only by said box-like elements and by said securing means, and comprising girder flange or chord means capable of transmitting and sustaining tensile and compressive forces of bending and substantially relieving the box-like elements of such main flange stresses, and the box-like elements comprising girder web means transmitting and sustaining shearing stress in said rigid girder structure.

25. In combination in a structural assembly, a plurality of box-like elements disposed in a row, at least one pair of angle members extending longitudinally of said row and continuously along aligned surfaces of said plurality of box-like elements and receiving in each one of said pair of continuous angles one of a pair of longitudinal corners of each box-like element, said box-like elements each being provided with recesses one at each end of said longitudinal corners of the box-like element, and means extending between each of said continuous angles and each of the said box-like elements and into said recesses at each end of the corresponding longitudinal corners of each box-like element and rigidly securing each box-like element to said continuous angles, providing a rigid structure capable of functioning as a girder.

26. In combination in a structural assembly, a plurality of box-like elements disposed in a row, at least one pair of angle members extending longitudinally of said row and continuously along aligned surfaces of said plurality of box-like elements and receiving in each one of said pair of continuous angles one of a pair of longitudinal corners of each box-like element, said box-like elements each being provided with recesses one at each end of said longitudinal corners of the box-like element, and securing means including wedge means mounted in each of said recesses and extending from said recesses into wedging engagement with the corresponding angle member and rigidly securing each box-like element to said continuous angles, said box-like elements being spaced apart a substantial distance in said row, said continuous angle members spanning the spaces between said elements, providing a rigid structure capable of functioning as a girder, said securing means being accessible for individual adjustment by means of said spaces and said recesses.

27. In combination in a structural assembly a plurality of box-like elements disposed in a row, an angle member extending longitudinally of said row and continuously along aligned surfaces of said plurality of box-like elements and receiving a longitudinal corner of each box-like element, said box-like elements being spaced apart a substantial distance in said row, said continuous angle member spanning the spaces between said elements, said box-like elements being provided with recesses one at each end of said longitudinal corner of each box-like element, and means extending between said continuous angle member and each of said box-like elements and into said recesses at each end of said longitudinal corner of each box-like element and rigidly securing each box-like element of said row to said continuous angle member, said securing means being accessible for individual adjustment by means of said spaces and said recesses.

28. In a structural assembly according to claim 27, said securing means including wedge means mounted in each of said recesses and extending from said recesses into wedging engagement with said angle member and rigidly locking the box-like element to said angle member.

29. In combination in a structural assembly, a plurality of box-like elements disposed in a row, at least one pair of angle members extending longitudinally of said row and continuously along aligned surfaces of said plurality of box-like elements and receiving in each one of said pair of continuous angles one of a pair of longitudinal corners of each box-like element, means extending between each of said plurality of box-like elements and each one of said pair of continuous angles and rigidly securing each box-like element of said row individually to said continuous angles, a second row of box-like elements having at least one pair of continuous angle members receiving a pair of longitudinal corners of said box-like elements with means rigidly securing each box-like element of said second row individually to said continuous angles, a pair of continuous angle members on one row of box-like elements being disposed in face to face abutting relationship with a pair of angle members of the other row of box-like elements, and means for securing together said face to face abutting continuous angle members of the said rows, providing a rigid structure adapted to resist distortion.

30. In combination in a structural assembly, a plurality of box-like elements disposed in a row, at least one pair of angle members extending longitudinally of said row and continuously along aligned surfaces of said plurality of box-like elements and receiving in each one of said pair of continuous angles one of a pair of longitudinal corners of each box-like element, means extending between each of said plurality of box-like elements and each one of said pair of continuous angles and rigidly securing each box-like element of said row individually to said continuous angles, a second row of box-like elements having at least one pair of continuous angle members receiving a pair of longitudinal corners of said box-like elements with means rigidly securing each box-like element of said second row individually to said continuous angles, a pair of continuous angle members of one row of box-like elements being disposed in face to face abutting relationship with a pair of angle members of the other row of box-like elements, and means for securing together said face to face abutting continuous angle members of the said rows, providing a rigid structure adapted to resist distortion, said box-like elements in each row being spaced apart a substantial distance in said row, said continuous angle members of each row spanning the spaces between the box-like elements in each row, the box-like elements and the spaces between them in each row being laterally aligned with the box-like elements and the spaces in the other row, and said means for securing together said abutting angle members being disposed in said laterally aligned spaces and extending laterally of the structural assembly and securing said rows of box elements and angle members together.

31. In a structural assembly according to claim 30, closure plates closing the spaces between said box-like elements in each row and being substantially flush with the respective surfaces of said elements and engaging said angle members.

32. In a structural assembly according to claim 30, said means for securing together said abutting angle members comprising link and pin means at the upper part of the assembly and tie-rod means at the lower part of the assembly.

33. In a structural assembly according to claim 30, closure plates closing the spaces between said box-like elements in each row and being substantially flush with the respective surfaces of said elements and having means at the ends thereof abutting said angle members, said closure plates being of channel form with depending flanges, and lugs on the sides of said box-like elements supporting said depending flanges of said channel plates.

JOHN N. LAYCOCK.

REFERENCES CITED

The following references are of record in the file of this patent:

UNITED STATES PATENTS

| Number | Name | Date |
|---|---|---|
| 444,579 | Jackson | Jan. 13, 1891 |
| 522,348 | Martini | July 3, 1894 |
| 601,554 | Clark | Mar. 29, 1898 |
| 820,974 | Hilpert | May 22, 1906 |
| 920,284 | Donnelly | May 4, 1909 |
| 1,019,224 | Clark | Mar. 5, 1912 |
| 1,073,794 | Christensen | Sept. 23, 1913 |
| 1,430,179 | Owens et al. | Sept. 26, 1922 |
| 1,640,980 | Caroni | Aug. 30, 1927 |
| 1,739,326 | Posselt | Dec. 10, 1929 |
| 1,905,377 | Garner | Apr. 25, 1933 |
| 1,908,714 | Schneider | May 16, 1933 |
| 1,997,884 | Melker | Apr. 16, 1935 |
| 2,134,008 | Sharp | Oct. 25, 1938 |
| 2,399,202 | Byrne | Apr. 30, 1946 |

FOREIGN PATENTS

| Number | Country | Date |
|---|---|---|
| 24,841 | Great Britain | 1895 |
| 183,211 | France | Apr. 30, 1887 |
| 361,911 | France | Nov. 14, 1906 |
| 479,381 | Great Britain | Feb. 4, 1938 |